(12) United States Patent
Wang

(10) Patent No.: US 11,367,910 B2
(45) Date of Patent: Jun. 21, 2022

(54) SYSTEMS AND METHOD OF BATTERY CHARGING ASSISTED BY HEATING

(71) Applicant: EC POWER, LLC, State College, PA (US)

(72) Inventor: Chao-Yang Wang, State College, PA (US)

(73) Assignee: EC POWER, LLC, State College, PA (US)

(*) Notice: Subject to any disclaimer, the term of this patent is extended or adjusted under 35 U.S.C. 154(b) by 258 days.

(21) Appl. No.: 16/356,129

(22) Filed: Mar. 18, 2019

(65) Prior Publication Data
US 2019/0319321 A1    Oct. 17, 2019

Related U.S. Application Data

(60) Provisional application No. 62/658,176, filed on Apr. 16, 2018.

(51) Int. Cl.
*H01M 10/6571*    (2014.01)
*H02J 7/00*    (2006.01)
(Continued)

(52) U.S. Cl.
CPC ... *H01M 10/6571* (2015.04); *H01M 10/0525* (2013.01); *H01M 10/0562* (2013.01);
(Continued)

(58) Field of Classification Search
CPC ................ H01M 10/615; H01M 10/6571
(Continued)

(56) References Cited

U.S. PATENT DOCUMENTS 6,072,301 A * 6/2000 Ashtiani ............. H01M 10/615
320/128
6,326,767 B1 * 12/2001 Small ..................... H02J 7/0045
320/116
(Continued)

FOREIGN PATENT DOCUMENTS

CN    106785235 A    5/2017
JP    6238582 B2    11/2017
(Continued)

OTHER PUBLICATIONS

Juchuan Li et al., "Potentiostatic Intermittent Titration Technique for Electrodes Governed by Diffusion and Interfacial Reaction", The Journal of Physical Chemistry, C 2012, 116, 1472-1478.
(Continued)

*Primary Examiner* — Suchin Parihar
(74) *Attorney, Agent, or Firm* — Morgan, Lewis & Bockius LLP

(57) ABSTRACT

A rapid heating-charging process for charging a rechargeable battery is disclosed. Such a process can be implemented by an integrated heating and battery system can include a rechargeable battery and a heating element in thermal contact with the at least one cell of the battery and electrically connected in series to a switch wherein the heating element and switch form a switch-heater assembly. The switch-heater assembly can be electrically connected in parallel with the battery to form a battery-switch-heater circuit. Advantageously, the battery-switch-heater circuit is configured to be directly electrically engaged with a charger so that the heating element is powered mainly by the charger and electrically connected to the battery when the heating element is powered by the charger. Such a system can be used in a charging operation to pre-heat the battery to a predetermined charging temperature which advantageously
(Continued)

improves charge kinetics and reduce charge overpotential, thereby enabling fast charging and charging at a variety of temperatures.

24 Claims, 12 Drawing Sheets

(51) Int. Cl.
*H01M 10/0525* (2010.01)
*H01M 10/0562* (2010.01)
*H01M 10/615* (2014.01)

(52) U.S. Cl.
CPC ........... *H01M 10/615* (2015.04); *H02J 7/007* (2013.01); *H01M 2220/20* (2013.01)

(58) Field of Classification Search
USPC ........................................................ 320/107
See application file for complete search history.

(56) References Cited

U.S. PATENT DOCUMENTS

| | | | |
|---|---|---|---|
| 6,441,588 B1* | 8/2002 | Yagi | H02J 7/0091 320/139 |
| 8,779,728 B2 | 7/2014 | Zhou | |
| 9,799,934 B2 | 10/2017 | Kaihara | |
| 11,070,074 B2* | 7/2021 | Yi | H02J 7/007192 |
| 2009/0087723 A1* | 4/2009 | In | H01M 16/003 429/62 |
| 2009/0317724 A1 | 12/2009 | Kumar et al. | |
| 2010/0190061 A1 | 7/2010 | Green | |
| 2011/0052944 A1 | 3/2011 | Matthias et al. | |
| 2013/0028808 A1 | 1/2013 | Kim | |
| 2014/0285135 A1* | 9/2014 | Ji | H01M 10/615 320/129 |
| 2014/0333267 A1* | 11/2014 | Crawley | H01M 10/615 320/150 |
| 2015/0104681 A1 | 4/2015 | Wang et al. | |
| 2015/0303444 A1 | 10/2015 | Wang et al. | |
| 2016/0023563 A1* | 1/2016 | Wang | B60L 58/24 320/129 |
| 2016/0036100 A1* | 2/2016 | Wang | H02J 7/0091 320/127 |
| 2016/0156081 A1 | 6/2016 | Wang et al. | |
| 2017/0085107 A1* | 3/2017 | Rastegar | H01G 11/54 |
| 2017/0120775 A1* | 5/2017 | Murata | B60W 10/26 |
| 2018/0126177 A1* | 5/2018 | Scott | A61B 5/4836 |
| 2018/0262043 A1* | 9/2018 | Yi | H02J 7/007192 |
| 2019/0305393 A1* | 10/2019 | Oguma | B60L 58/13 |
| 2019/0319321 A1 | 10/2019 | Wang | |
| 2020/0176835 A1* | 6/2020 | Rastegar | H01M 10/443 |

FOREIGN PATENT DOCUMENTS

| | | |
|---|---|---|
| KR | 10-2015-0122800 A | 11/2015 |
| WO | 2016/018830 A1 | 2/2016 |

OTHER PUBLICATIONS

Xia-Guang Yang et al., "Fast charging of lithium-ion batteries at all temperatures", Proceedings of the National Academy of Sciences, Jul. 2018, vol. 15 (28), 7266-7271.

Notification of Transmittal of the International Search Report and the Written Opinion of the International Search Authority, or the Declaration issued in International Application No. PCT/US2019/022690 dated Jul. 2, 2019.

International Search Report issued in International Application No. PCT/US2019/022690 dated Jul. 2, 2019.

Written Opinion issued in International Application No. PCT/US2019/022690 dated Jul. 2, 2019.

Extended European Search Report dated Apr. 23, 2021 issued in European Patent Application No. 19789010.6.

Yang et al., "Innovative heating of large-size automotive Li-ion cells," J. Power Sources, No. 342, 2017, pp. 598-604.

Ji et al., "Heating strategies for Li-ion batteries operated from subzero temperatures," Electrochemica Acta, No. 107, 2013, pp. 664-674.

Pesaran et al., "Cooling and preheating of batteries in hybridelectric vehicles," The 6th ASME-JSME Thermal Engineering Joint Conference, Hawaii, 2003, pp. 1-7.

Yang et al., "Fast Charging of lithium-ion batteries at all temperatures," Proceedings of the National Academy of Sciences of the United States of America (PNAS), No. 115, vol. 28, 2018, pp. 7266-7271.

Notification Concerning Transmittal of International Preliminary Report on Patentability issued in corresponding International Application No. PCT/US2019/022690 dated Oct. 29, 2020.

International Preliminary Report on Patentability issued in corresponding International Application No. PCT/US2019/022690 dated Oct. 20, 2020.

\* cited by examiner

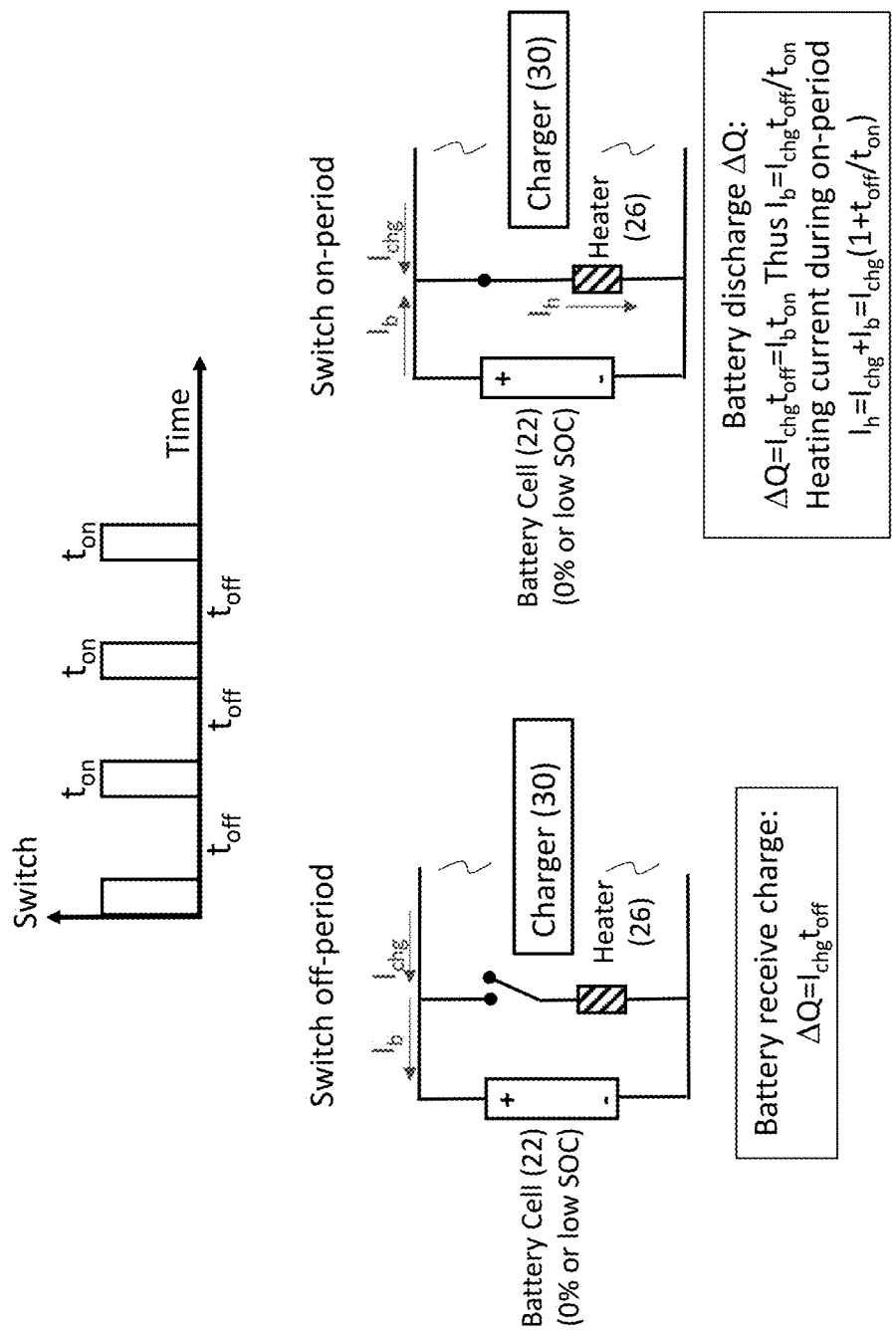
FIG. 4 schematics of pulsed switching operation according to the present disclosure

SYSTEMS AND METHOD OF BATTERY CHARGING ASSISTED BY HEATING

CROSS-REFERENCE TO RELATED APPLICATION

This application claims the benefit of U.S. Provisional Application No. 62/658,176 filed 16 Apr. 2018, the entire disclosure of which is hereby incorporated by reference herein.

TECHNICAL FIELD

The present invention relates generally to rechargeable electrochemical energy storage cells. In particularly, the present disclosure is directed to improving the charge process of rechargeable batteries such as lithium ion batteries.

BACKGROUND

Rechargeable lithium ion batteries are widely used in electrified vehicles, consumer electronics and stationary energy storage systems. An essential part of using rechargeable batteries is the charging process which incurs an overpotential above an equilibrium potential depending on charge kinetics and charging rate. As a result, the cell voltage during charge rises and potentially hits a voltage upper limit defined by occurrence of significant degradation of battery materials inside the cell. This restricts the allowable charge overpotential which in turn lowers the charge rate (or equivalently extends charge time) and requires near-room-temperature for the charging operation to proceed. Both factors greatly inconvenience battery usage in applications. Therefore, there is a need to improve the charge kinetics and hence reduce the charge overpotential for rechargeable batteries.

Several publications disclose charging systems that have relatively complicated configurations which include devices electrically connected between a rechargeable battery and its charger such as DC-DC converters (e.g., U.S. Pat. Nos. 8,779,728, 9,799,934). Other charging systems electrically disconnect the rechargeable battery when heating the battery (e.g., U.S. patent application publication 2013-0288089). However, there is a continuing need to improve charge time and the range of charging temperatures.

SUMMARY OF THE DISCLOSURE

An advantage of the present disclosure is a heating-charging process for charging a rechargeable battery. Such a process can be implemented by an integrated heating and battery system that enables fast charging and charging at a variety of temperatures. Such processes and systems are useful for battery charging in consumer electronics, transportation, aerospace, military, and stationary energy storage applications.

These and other advantages are satisfied, at least in part, by a charging method for charging a battery comprising: a first operation which includes heating a cell of the battery when the battery cell is below a predetermined charge temperature ($T_2$) and a second operation which includes charging the battery cell by an external charger when the battery is at or above $T_2$. Advantageously, the battery cell can be heated at a rate of at least 5° C./min, e.g., at least 10° C./min, such as at least 20, 30, 40 and 50° C./min, when the battery cell is below $T_2$ to rapidly heat the battery cell. At certain low temperatures, such as at temperatures which adversely affect a battery cell when charging, little to no charging of the battery cell occurs during the first operation of heating the battery cell. The method can also include determining a temperature of the battery cell and if the temperature is below $T_2$, initiating the first operation to heat the battery cell and if the temperature is at or above $T_2$, charging the battery cell.

Another aspect of the present disclosure includes an integrated heating and battery system including a rechargeable battery having at least one battery cell and a heating element in thermal contact with the at least one battery cell and electrically connected in series to a switch to form a switch-heater assembly. The switch-heater assembly is electrically connected in parallel with the battery to form a battery-switch-heater circuit and the battery-switch-heater circuit is configured to be directly electrically engaged with a charger. Advantageously, the heating element is powered mainly by the charger and electrically connected to the at least one battery cell when the heating element is mainly powered by the charger.

The battery configuration of the present disclosure can be applied to a variety of battery chemistries and forms such as, but not limited to, lithium-ion, lithium-polymer, lead-acid, nickel-metal hydride, lithium-sulfur, lithium-air, all solid-state batteries, etc. For example, the at least one battery cell can include an anode which comprises lithium metal, silicon or a silicon-carbon composite.

In certain embodiments, the heating element can be located inside a battery cell (exposed to the electrolyte), or in contact with an outside surface of a battery cell to be in thermal contact with the cell or if more than one heating element are included in the system, the heating elements can be both inside and outside of a cell, each in thermal contact with the cell and in electrical contact with the switch. In addition, the switch can be located inside a battery cell. In some embodiments, the heating element comprises a resistor sheet which is flat.

In other embodiments, the switch can include an electro-mechanical relay and a temperature controller, or a solid-state relay with a temperature sensor, or a power MOSFET with a temperature sensor, or a high-current switch with a temperature sensor, or an insulated-gate bipolar transistor, or a bi-metal switch. In further embodiments, the switch is configured to be driven by a temperature sensor to turn ON when the battery cell temperature is below a first predetermined value or turn OFF if the battery cell temperature is at or above a second predetermined value. In still other embodiments, the switch can be configured to pulse with time during a charging and/or heating operation.

A further aspect of the present disclosure includes a charging method for charging a battery comprising an integrated heating and battery system according to the present disclosure. The method can include a first operation which includes heating a cell of the battery by powering a heating element with a charger when the battery cell is below a predetermined charge temperature ($T_2$). The method can also include determining a first temperature of the battery cell prior to charging and if the first temperature is below $T_2$, initiating the first operation. The method can also include a second operation which includes charging the battery cell by the charger (without powering the heating element) when a temperature of the battery cell is or above $T_2$.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein:

FIG. 3A illustrates a constant current, constant voltage (cccv) charging operation without heating and FIG. 3B illustrates a constant current, constant voltage charging operation preceded by heating (h-cccv) a battery cell in accordance with an implementation of the present disclosure.

FIG. 4 shows schematics of a pulsed switching operation in a battery heating-charging operation according to an aspect of the present disclosure.

FIG. 5A illustrates the evolution of charge voltage during the charging operation; FIG. 5B illustrates electrical current flowing through the heating element (e.g., a nickel foil) and the battery cell, respectively, during the charging operation; FIG. 5C is a chart of the battery surface temperature during the charging operation; and FIG. 5D is a chart of the battery's state of charge (SOC) during the charging operation.

FIG. 6A displays voltage curves during heating and charging steps and battery surface temperature evolutions during the heating step. FIG. 6B summarizes heating time and total charge time in all cases.

DETAILED DESCRIPTION OF THE DISCLOSURE

The present disclosure relates to battery systems with improved charging processes which enable fast charging (saving time) and allow charging at substantially all environmental temperatures including subfreezing temperatures. The battery systems of the present disclosure can advantageously lower charge overpotential and thus increase energy efficiency of battery cells upon cycling of discharge and charge.

Figure 1B:
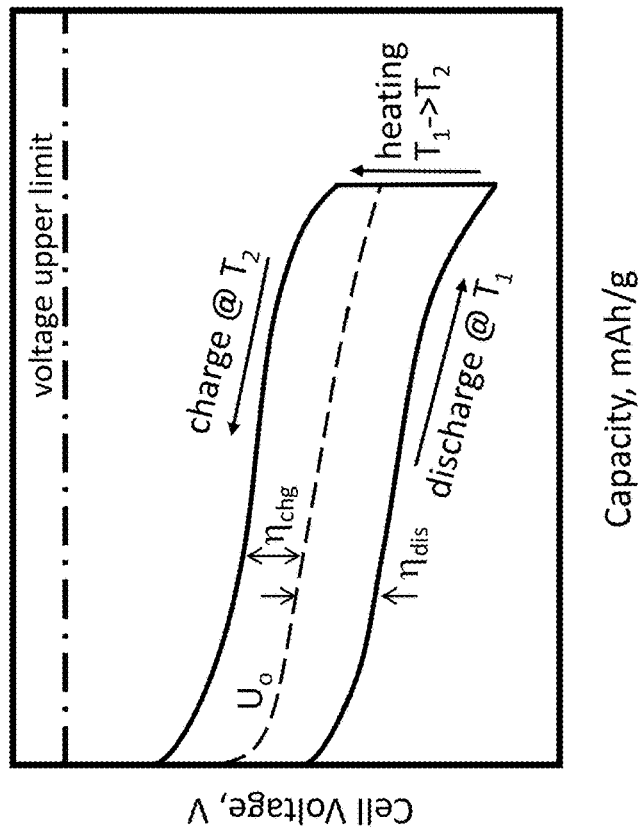
FIG. 1B schematically illustrates a battery charging method in accordance with an implementation of the present disclosure.
Figure 1A:
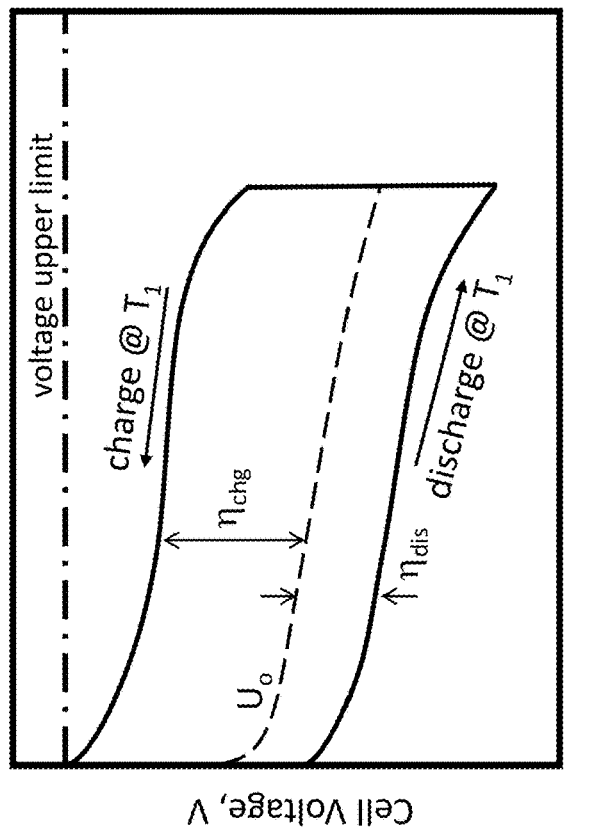
FIG. 1A schematically illustrates a battery charging method without the benefit of heating the battery.

As explained in the Background section, an essential part of using rechargeable batteries is the charging process which incurs an overpotential above an equilibrium cell potential depending on charge kinetics and charging rate. As a result, the cell voltage during charge rises and usually hits a voltage upper limit (see FIG. 1A) defined by the occurrence of significant degradation of battery materials inside the cell. Battery degradation restricts the allowable charge overpotential ($\eta_{chg}$) (i.e. the difference between charge voltage and open-circuit equilibrium potential $U_o$), which in turn lowers the charge rate (or equivalently extends charge time) and requires near-room-temperature for charging to proceed. Both factors, i.e., lower charge rate and near room-temperature charging, greatly inconvenience battery usage in practical applications. Advantageously, however, a configuration of a battery system of the present disclosure can add a heating step prior to a battery charging operation to raise the temperature of the battery from a first temperature ($T_1$) to at least a second temperature ($T_2$) (e.g., a preferred charging temperature), when a temperature of the battery is less than $T_2$, as shown in FIG. 1B. The higher charge temperature ($T_2$) prior to any significant charging thermally stimulates electrochemical and transport properties of a battery cell, thereby significantly improving charge kinetics and reducing charge overpotential ($\eta_{chg}$). The improved charge kinetics subsequently facilitates faster-rate charging of the battery than its un-heated counterpart, or reduces the charge overpotential under the same charging conditions to increase energy efficiency. See FIG. 1B.

An aspect of the present disclosure includes a heating-charging method to rapidly heat a battery and/or one or more cells thereof followed by charging. The method comprises a first operation which includes heating a cell of the battery at a rapid heating rate when the battery cell is below a predetermined charge temperature ($T_2$). Preferably, the battery cell is heated at a rate of at least 5° C./min, e.g., at least 10° C./min, such as at least 20, 30, 40 and 50° C./min. Heating the battery cell at such a rapid rate can be achieved by powering a heating element with a charger such as a charge also used to charge the battery cell. The heating element is preferably in thermal contact with the battery cell.

The heating operation can include heating the battery cell to or above $T_2$ before significantly charging the battery cell. At certain low temperatures, such as at temperatures which adversely affect a battery cell when charging, little to no charging of the battery cell occurs during the first operation of heating the battery cell. In such low temperatures, the battery cell is rapidly heated with little to no charging, i.e., less than 0.1 C or less than 0.05 C charging or no measurable charging.

The pre-determined charge temperature ($T_2$) is a value that can be selected to be most beneficial to the electrochemical and transport processes underlying battery charging. For example, the charge temperature can be at least 35° C., 40° C., or a temperature significantly higher such as near or at 60° C.

The method can further include a second operation which includes charging the battery cell by a charger when the battery cell is at or above $T_2$. When the cell of the battery is at or above $T_2$, the heating of the cell can be discontinued, i.e., charging the battery cell can occur without heating the battery cell with a separate heating source.

In certain embodiments, the method can also include charging the battery at or above $T_2$ with an external power source at constant current, constant voltage, constant power or variable power, or any combination thereof. For example, the method can also include charging the battery at or above $T_2$ with the external power source at a constant current until reaching a voltage upper limit followed by a constant voltage at the upper limit of cell voltage until a predetermined current is reached. In other embodiments, the method can include determining a temperature of the battery cell and if the temperature is below $T_2$, initiating the first operation to heat the battery cell and if the temperature is at or above $T_2$, charging the battery cell. Further embodiments include a rest period between the heating operation and charging operation.

Another aspect of the present disclosure includes an integrated battery heating and charging system comprising a rechargeable battery including at least one battery cell. The system further comprises a heating element in thermal contact with the at least one battery cell and electrically connected in series to a switch to form a switch-heater assembly. The system also includes a battery-switch-heater circuit. The battery-switch-heater circuit can be configured to be directly electrically engaged with a charger, e.g., the battery-switch-heater circuit can be configured to be directly electrically engaged with the charger such that current from the charger directly flows to the battery-switch-heater circuit without interruption by other devices such as a DC/DC converter. As used herein a charger refers to any external charging source, such as an external battery charger or an external power source, that can charge the rechargeable battery of the system.

Advantageously, the switch-heater assembly is electrically connected in parallel with the battery. By this simple configuration, the heating element and battery can be powered by the same charger without the need for an extra power source and without the need for an electronic control unit (ECU) or a battery management system (BMS). The system of present disclosure fundamentally differs from other systems which disclose additional devices electrically connected between a charger and a battery or which use separate circuits for charging and heating and control units and BMS for such separate circuits. In certain aspects, systems of the present disclosure differ from other systems in that the battery and heater of the present disclosure are connected in parallel whereas in certain systems they are electrically connected in series. This difference can allow the charger to operate in the same voltage window as in a conventional case.

Figure 2A:
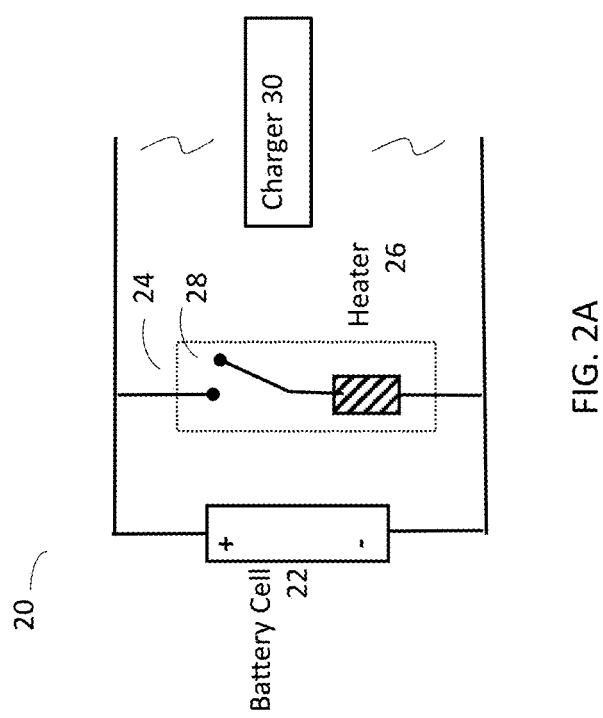
FIG. 2A is a schematic of a battery-switch-heater circuit according to an embodiment of the present disclosure.

FIG. 2A schematically illustrates a battery-switch-heater circuit which is configured to be directly electrically engaged with an external charger (30). As shown in the figure, the circuit includes battery cell 22 and a switch-heater assembly 24 in which heating element 26 is electrically connected to switch 28 in series. The figure further shows that battery 22 and switch-heater assembly 24 are directly electrically connected in parallel to a charging source such as an external battery charger or an external power source (30). Although not illustrated in FIG. 2A, heating element 26 would be in thermal contact with battery cell 22. In certain embodiments, the heating element can be located either inside a battery cell (exposed to the electrolyte), or in contact with an outside surface of a battery cell to be in thermal contact with the cell. In addition, the switch can be located with the heating element inside a battery cell.

In an aspect of the present disclosure, the heating element can be powered mainly (>50% such as >51%) by the charger when the switch is ON, and charging of the battery is powered by the charger when said switch is OFF. Powering the heating element heats the battery and raises its temperature. As persons of skill in the art would appreciate, when the switch is ON, charge current prefers to flow through the heating element than the battery because the voltage of the heating element is configured to be significantly less than that of the battery. Hence, in certain aspects during a heating operation in a heating-charging method, little to no charging of the battery cell occurs.

Figure 2B:
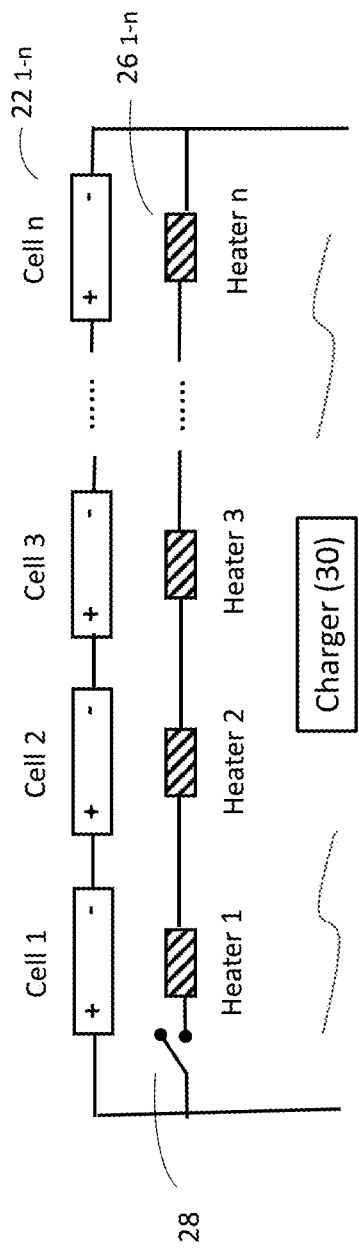
FIG. 2B is a schematic of a circuit including a plurality of battery cells, heaters and one or more switches according to one embodiment of the present disclosure.

Although FIG. 2A shows one battery cell with one switch-heater assembly, the integrated heating and battery system of the present disclosure can include a battery with a plurality of electrochemical cells, and/or a plurality of heating elements and/or a plurality of switches. For example, in other embodiments, such exemplary circuit shown in FIG. 2B, the system can include a plurality of battery cells ($22_{1-n}$) and can optionally include a plurality of heater elements ($26_{1-n}$) in thermal contact with the plurality of battery cells and optionally one or more switches (28) in which heater elements are electrically connected in series to the one or more switches to form a plurality of switch-heater assemblies. The battery cells and switch-heater assemblies are directly electrically connected in parallel to a charging source such as an external battery charger or an external power source (30).

In practicing certain embodiments of the present disclosure, an integrated heating and battery system can be charged by a first operation which includes heating the battery by powering the heating element with a charger when the battery is below a predetermined charge temperature ($T_2$). The charging operation can further include, prior to battery charging or heating, determining a temperature of the battery as, for example, by a temperature sensor. If the determined temperature is lower than a predetermined value desirable for battery charging (e.g., less than $T_2$), the switch in the integrated system is activated and heating of the heater is powered by a charging source which can be the same charging source used to charge the battery. When the battery temperature determined by the temperature sensor reaches the pre-determined value or above, the switch is turned OFF and charging of the battery can be powered by the same charger. Hence, a second charging operation includes charging the battery by the charger (without powering the heating element) when the battery is at a temperature at or above $T_2$.

Advantageously, the same charging source (battery charger or external power source) in the present system can seamlessly power the heater when the switch is ON and charging of the battery when the switch is turned OFF. For example, the integrated heating and charging system of the present disclosure does not need a DC/DC converter, an inverter, a diode, or additional switch(es) (other than one connected with the heater in series), an ECU or BMS to configure battery heating or charging in its implementation. Hence, in some embodiments, the integrated heating and charging system of the present disclosure excludes either a DC/DC converter, an inverter, a diode, additional switch(es), an ECU, or any combinations of such devices between the charging source and the battery. A salient feature of the integrated heating and battery system according to certain embodiments of the present disclosure is its simplicity and hence lower cost of such a system as compared to more complex systems found in conventional BMS.

The pre-determined charge temperature ($T_2$) is a value that can be selected to be most beneficial to the electrochemical and transport processes underlying battery charging and can be substantially higher than room temperature in certain cases. For example, the charge temperature may be determined to be near human body temperature, i.e. 35-40° C., or a temperature significantly higher such as near or at 60° C.

In some embodiments, the first operation for battery heating can include energy delivery from the charger in constant current, constant voltage, constant power or variable power. In addition, the first operation for battery heating can include heating the battery at a fast rate, i.e., at a rate of at least 1 degree Celsius per minute. More preferably, the first charging operation for battery heating can include heating the battery at a rapid rate of at least 5° C./min, e.g., at least 10° C./min, such as at least 20, 30, 40 and 50° C./min.

Figure 3B:
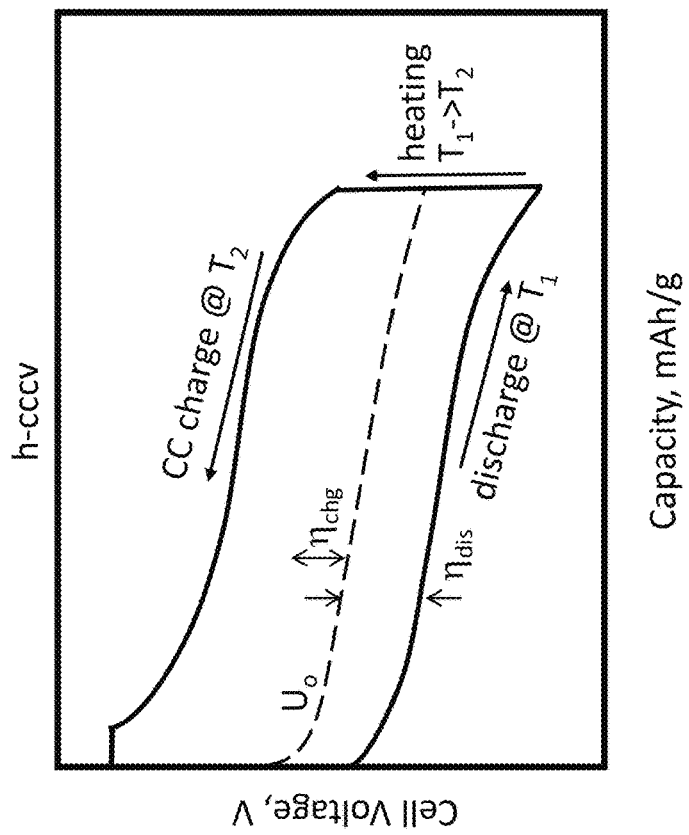
FIGS. 3A and 3B schematically illustrate a battery charging method, without and with a separate heating operation.
Figure 3A:
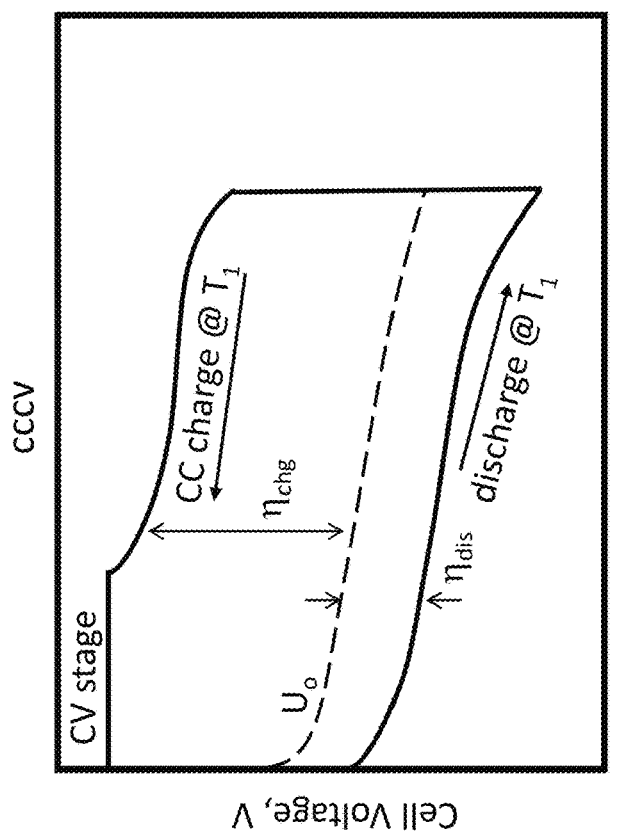

Traditionally, batteries are charged by a constant current-constant voltage (cccv) charging method such as illustrated in FIG. 3A. One embodiment of the present invention is a new charging algorithm dubbed h-cccv (See FIG. 3B). Such a h-cccv charging algorithm can include a battery heating step, a constant current stage until reaching the voltage upper limit, and then a constant voltage stage fixed at an upper limit until the charge current diminishes to e.g. C/20. The h-cccv method can be realized by an integrated heating and charging system of the present disclosure. For example, in a battery with a switch-heater assembly, the switch can be configured to first turn on heating until the battery temperature reaches a predetermined temperature most suitable for charging. Subsequently, the switch can be turned off so the charger power is used fully for charging the pre-heated battery in a cccv mode. The h-cccv method is particularly suited for fast charging from low temperatures to room temperature or optimal charging temperatures.

As used herein the terms rechargeable battery or battery are used to represent any rechargeable electrochemical energy storage device that contains one or more electrochemical cells. The basic elements of a battery cell include an anode electrode coated on a current collector, a cathode electrode coated on another current collector and an electrolyte.

The integrated heating and battery system of the present disclosure can include a variety of battery chemistries such as, but not limited to, lithium-ion, lithium-polymer, lead-acid, nickel-metal hydride, nickel-manganese-cobalt, lithium-sulfur, lithium-air and all solid-state batteries. In particular, lithium metal batteries where the anode electrode is composed of lithium metal for high energy density can benefit from the present disclosure. During charging of lithium metal batteries, lithium deposition is prone to dendritic growth because it is the most efficient morphology to reduce the species diffusion resistance and to minimize the surface overpotential. The dendritic growth and ensuing low plating/stripping columbic efficiency are specially pronounced at low temperatures and high charging currents. The present disclosure addresses both problems by operating lithium plating at elevated temperatures and taking advantage of low-melting-point of lithium metal, much enhanced interfacial kinetics of Li plating reaction, much improved ionic conductivity of electrolytes, and much improved interfacial diffusion of Li atoms. The result of all these improvements lead to high columbic efficiency of Li plating/stripping cycle, dendrite-free growth, and high charging current density.

Batteries, wherein the anode is composed of Si or a Si-graphite composite, can be improved by the present disclosure. The experimental measurements of Li et al. (J. Li, F. Yang, Y.-T. Cheng, M. W. Verbrugge, X. Xiao, J. Phys. Chem. C 116, 2012) found that the Li diffusion coefficient in Si is two orders of magnitude lower than in graphite, which is problematic for fast charging. This problem can now be addressed by a pre-heating operation such that the Li diffusion coefficient in Si is substantially increased during an elevated temperature heating-charging method of the present disclosure.

Additionally, a battery containing either a highly concentrated electrolyte (e.g. with a salt concentration of at least about 4 moles per liter (4 M)) or a solid electrolyte can benefit from the present disclosure. For example, a battery cell having a high-concentration electrolyte tends to be viscous and exhibits low ionic conductivity. However, a heating-charging method according to implementations of the present disclosure can significantly reduce the charge overpotential. Solid electrolytes such as polymer electrolytes, sulfide electrolytes and oxide electrolytes exhibit high interfacial charge-transfer resistance and/or low ionic conductivity. A heating-charging method according to implementations of the present disclosure, however, is also beneficial to reduce the overall charge overpotential of battery cells having solid electrolytes.

Another battery chemistry that can benefit from the present disclosure is a lithium air battery where the oxygen evolution reaction during charging is notoriously sluggish. The air cathode reacts with Li ions and oxygen in air to form an oxide thereof, e.g., $Li_2O_2$, during discharge. During charge the lithium oxide, e.g., $Li_2O_2$, is decomposed into Li ions and electrons, releasing oxygen. The charge overpotential for the air cathode is usually very high; consequently, using thermal stimulation as in the present invention is particularly effective to reduce the charge overpotential, leading to much improved energy efficiency of Li-air batteries.

In an embodiment of the present disclosure, the heating element comprises at least one resistor sheet that can be located either inside a battery cell (exposed to the electrolyte), or outside and between two battery cells, or a combination of some resistor sheets inside cells and some resistor sheets outside cells. The resistor sheet preferably has a resistance in units of Ohm equal to the numerical value of between 0.1 to 5 divided by the battery's capacity in Amp-hours (Ah), e.g. between about 0.5 to 2 divided by the battery's capacity in Ah. For example, the resistor sheet for a 20 Ah battery is preferably between about 0.005 Ohm (0.1 divided by 20) to about 0.25 Ohm (5 divided by 20), e.g. between about 0.025 Ohm (0.5 divided by 20) to about 0.1 Ohm (2 divided by 20).

The resistor sheets of the present disclosure can be made of, for example, graphite, highly ordered pyrolytic graphite (HOPG), stainless steel, nickel, chrome, nichrome, copper, aluminum, titanium, or combinations thereof. If used outside of battery cells and between two adjacent cells in a module, the resistor sheets do not need to be anti-corrosive and thus additional materials are available for use as resistor sheets of the present disclosure. In certain embodiments, the resistor sheet of the present disclosure preferably has two major surfaces, e.g. is a flat sheet with a large surface area, so that it can have good thermal communication with battery components. The resistor sheets of the present disclosure can have a thickness between about 1 micrometer and about 200 micrometers with a preferred range of about 5 to about 100 micrometers. Resistor sheets that have large electrical resistance, high thermal conductivity, and low cost are useful for certain embodiments of the present disclosure.

The resistance of the resistor sheet can be adjusted by patterning the sheet, i.e., removing material from the resistor sheet. Patterning allows a resistor sheet to have a sufficient thickness for mechanical strength and weldability but a reduced resistance. Patterns with rounded corners have the advantage of reducing temperature build-up at the corner of a pattern. Patterned resistor sheets can be manufactured by photo etching, electrical discharge machining, water jet cutting, laser cutting, stamping, etc.

In some embodiments, a substantial portion of the surface of a resistor sheet can be coated to avoid undesired chemical reactions or electrical connection with an electrolyte if the resistor sheet is inserted inside a battery cell. The protective coating should be thermally conductive, electrically insulating, and chemically stable within a battery cell. It can be made of polymers, metal oxides, and others. Examples of polymer materials for the protective coating include: polyethylene, polypropylene, chlorinated polypropylene, polyester, polyimide, PVDF, PTFE, nylon, or co-polymers of them. Examples of metal oxide materials for the protective coating include oxides of Mg, Al, Ti, V, Cr, Mn, Fe, Co, Ni, Cu, Zn, and combinations thereof. The protective coating is preferred to have a high dielectric constant. In some embodiments, adhesive may be used between resistor sheets and protective coating. The thickness of the protective coating may be between 10 nm to 100 μm, preferably 10 nm to 50 μm. The coating should be thin enough to allow good heat transfer but impervious to protect the resistor sheet from contact with the electrolyte inside a battery cell. The protective coating may be applied onto resistor sheets by such methods as taping, laminating, dip coating, spin coating, spraying coating, chemical vapor deposition, atomic layer deposition, solution casting, electrodeposition, self-assembled monolayer, stereolithography, surface oxidation, and others.

The switch of the switch-heater assembly of the present disclosure can be composed of an electromechanical relay and a temperature controller, or a solid-state relay with a temperature sensor, or a power MOSFET (metal oxide semiconductor field effect transistor) with a temperature sensor, or a high-current switch with a temperature sensor, or an IGBT (insulated-gate bipolar transistor). The switch of the present disclosure can be placed inside or outside a battery cell. In a case when the switch is located inside a battery cell, the switch, e.g. a MOSFET, can be integrated with the resistor sheet to form a flat substrate with a gate wire led out of the battery cell to control the switch from the outside of the battery cell.

It is preferred to maintain the battery working voltage, $V_{cell}$, above a predetermined value such as 2V in order to avoid any damage of battery materials inside the cell. FIG. 4 illustrates charge current flow of a battery cell configured with one switch-heater assembly as set forth in FIG. 2A. When the switch is turned on, i.e. in the heating mode, the cell voltage is equal to $I_h R_h$ which is roughly equal to $I_{chg} R_h$ if assuming a negligibly small current going through the battery cell, $I_b$. Thus, $I_{chg} R_h$ must be equal to or larger than 2V. This condition can be met when the charging rate is high. For example, for a 10 Ah battery cell with a heater's resistance of 0.06 Ohm, when the charge current is higher than 35 A (i.e. 3.5 C), the above condition is met such that the switch can be turned on whenever the battery temperature is below the predetermined charge temperature without risk of degrading battery materials. However, for low charge current or $I_{chg} R_h < 2V$, we may apply a pulsed switching protocol instead of continuous ON to keep the cell voltage above 2V. For example, and as shown in FIG. 4, during the OFF-period of the switch, the battery will receive a total charge of $I_{chg} t_{off}$. Once the switch turns to the ON-period, the battery will release the same charge received during the OFF-period to the heater, translating to a battery discharge current $I_b = I_{chg} t_{off}/t_{on}$. Thus the total heating current is actually equal to the sum of $I_b$ and $I_{chg}$ as displayed in FIG. 3. Therefore, $V_{cell} = I_h R_h = I_{chg} R_h (1 + t_{off}/t_{on}) > 2V$, which requires $t_{off}/t_{on} > 2/(I_{chg} R_h) - 1$. For example, for a low charge current such as 0.3 C, or 3 A of the same 10 Ah cell, the ratio of switch off-time to on-time needs to be greater than 10.11 or round up to 11 in order for cell voltage to always stay above the 2V threshold. This condition can be met when the switch is configured to have either a combination of $t_{on} = 1$ sec and $t_{off} = 11$ sec or another combination of $t_{on} = 0.1$ sec and $t_{off} = 1.1$ sec.

The switch of the present disclosure can be activated to pre-heat a battery cell from room temperature initially. This is preferred for ultra-fast charging of energy-dense electric vehicle (EV) batteries with high mass loading and thick electrodes, such as 10-min charging or faster to 80% state of charge. This is because fast charging of certain electric vehicle (EV) batteries benefit from much enhanced transport of electrolyte at elevated temperatures across a very thick electrode in order to avoid Li plating, a process severely degrading battery life. We note that battery degradation rate could double during battery charging at the elevated charge temperature ($T_2$), due to accelerated solid-electrolyte interphase (SEI) growth. However, the SEI growth depends on the exposure time. Charging usually takes less than 5% of the total charge-rest-discharge cycle time in practical applications, making increased battery degradation during charging at elevated temperature negligible as far as its impact on the total battery lifetime is concerned. For example, for 100,000 mile/10 year warranty traction batteries for a vehicle with 200 miles cruise range, it will take 500 charges to achieve 100,000 miles. Suppose all 500 charges are done by a 30-min fast charging method of the present disclosure, the total charge time is 250 hours. Out of 10-years lifetime, this is less than 0.3% time exposed to elevated temperature charging at $T_2$ and higher battery degradation.

The heating speed prior to battery charging is preferred to be at least 5° C./min, more preferred to be at least 10° C./min, such as at least 20, 30, 40 and 50° C./min. For example, for a 20° C. temperature rise prior to charging, it takes less than 4 minutes of heating, which has a negligible impact on, e.g., one-hour battery charging. The faster battery charging is, the faster the heating speed is preferred so as to make the heating step negligibly fast as compared to battery charging. In certain embodiments, the heating operation takes less than 10%, e.g., less than 5% of the total time to charge the battery to 80% SOC.

EXAMPLES

As an example, we build a 9.5 Ah pouch cell with lithium-nickel-manganese-cobalt (NMC622) as cathode, graphite as anode, 1M of $LiPF_6$ dissolved in ethylene carbonate/ethyl methyl carbonate (EC/EMC) (3:7 by wt.)+2 wt % vinylene carbonate (VC) as electrolyte, and Celgard-2325 microporous tri-layer membrane as separator. The cathodes were prepared by coating N-methylpyrrolidone (NMP) based slurry onto 15 μm thick Al foil, whose dry material includes NMC622 (91.5 wt %), Super-C65 (Timcal) (4.4 wt %) and polyvinylidene fluoride (PVdF) (Hitachi) (4.1 wt %) as a binder. The anodes were prepared by coating deionized (DI) water-based slurry onto 10 μm thick Cu foil, whose dry material includes graphite (95.4 wt %), Super-C65 (1.0 wt %), SBR (JSR) (2.2 wt %) and CMC (Nippon Paper) (1.4 wt %). The mass loading of NMC622 cathode and graphite anode was 10.574 mg/cm² and 6.678 mg/cm², corresponding to 1.85 mAh/cm² and 2.23 mAh/cm², respectively. After calendaring, the cathode and anode thickness (single-side) were 40.75 μm and 48.7 μm. The pouch cell included 34 anode and 33 cathode layers, with 152×75 mm footprint area, 9.5 Ah nominal capacity (relative to which all C-rates are defined), and specific energy of 170 Wh/kg and 334 Wh/L. We placed two Ni foils as the heating element inside the pouch cell, with one Ni foil located at ¼ cell thickness and the other at ¾ cell thickness from the top cell surface. Each Ni foil had a thickness of 30 μm and a resistance of 80.2 mΩ at 25° C. One end of the Ni foils is connected to the negative terminal, while the other end connected with a MOSFET switch which is then connected to the positive terminal, as schematically illustrated in FIG. 2A.

Figure 5A:
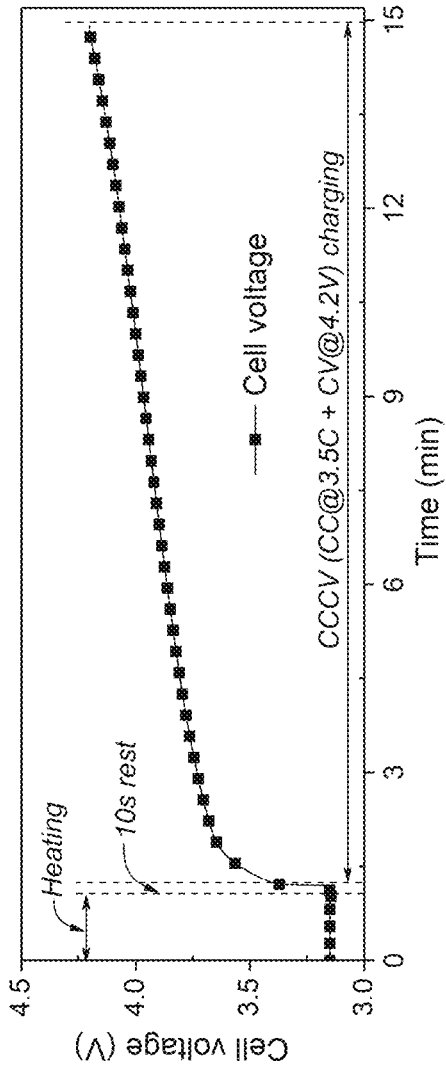
FIGS. 5A, 5B, 5C and 5D show experimental data of charging battery cells using a 3.5 C-charging rate and starting from a temperature of −40° C. according to a battery heating-charging method of the present disclosure.
Figure 5B:
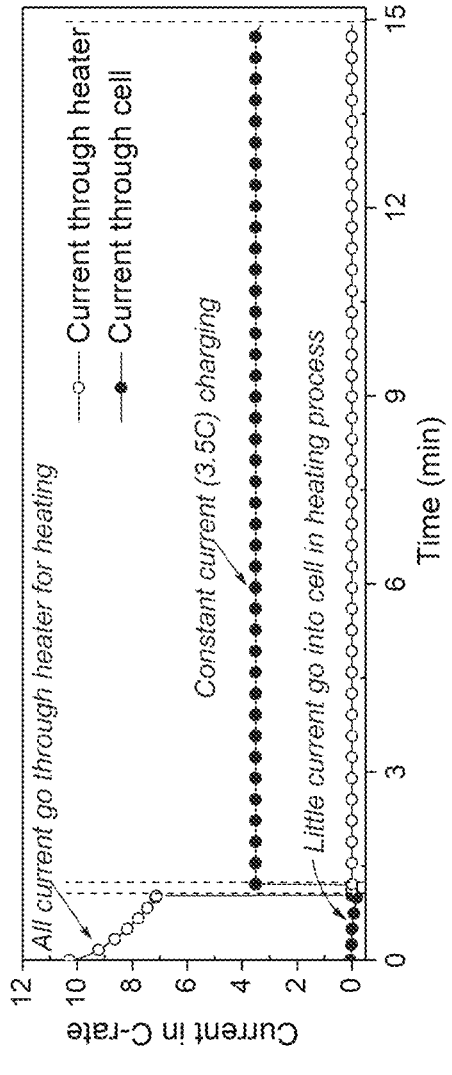
Figure 5C:
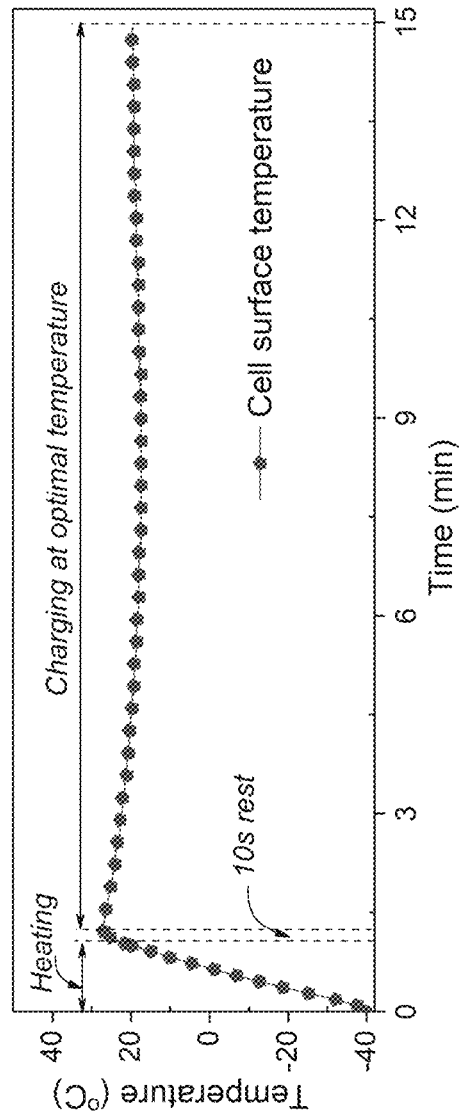
Figure 5D:
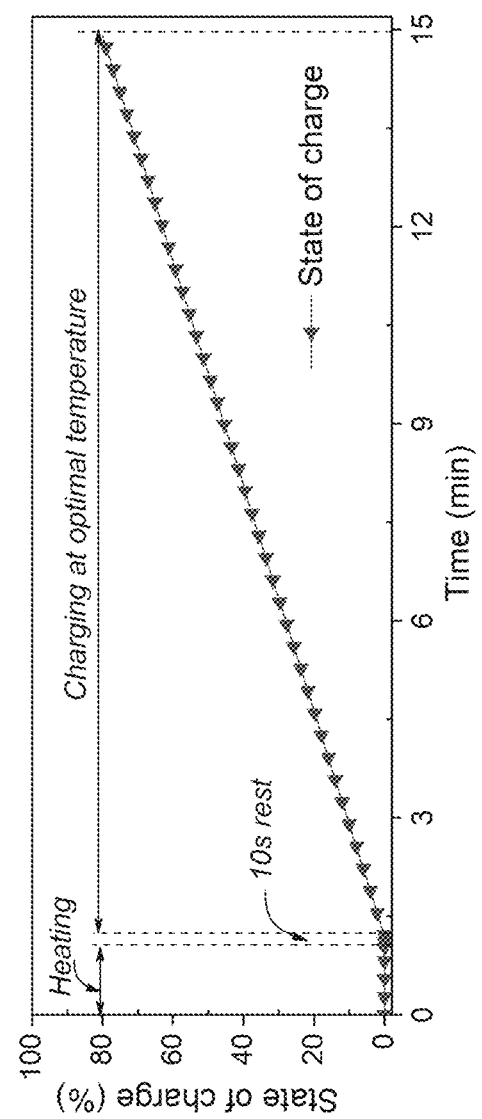

A heating-charging experiment of the 9.5 Ah cell was carried out at −40° C. ambient temperature. Experimental data are shown in FIG. 5A for charge voltage, FIG. 5B for charge current, FIG. 5C for cell temperature, and FIG. 5D for the battery's state of charge. Prior to the test, the fully discharged cell was soaked in an environmental chamber at −40° C. for >12 hours. For the initial heating step, electrical energy from the charging source can be delivered in constant current, constant voltage, constant power or variable power. In this experiment, we applied a constant voltage at 3.15V, slightly lower than the open circuit voltage of the battery (~3.2V), along with closing the switch for the heating step (see FIG. 5A). As such, virtually all electrical current from the charging source flowed into the Ni foil heater rather than the battery (see FIG. 5B) so there is no material damage while the battery was still cold. The cell was heated up rapidly (FIG. 5C). Once surface temperature of the cell reached 20° C., the MOSFET switch was opened to terminate the heating step, and the cell then rested 10-sec for relaxation of internal temperature gradient (FIG. 5C). Thereafter, the cell was charged with a constant current constant voltage (cccv) protocol at a current of 3.5 C and a cut-off voltage of 4.2V, until reaching 80% SOC (FIG. 5D). The total heating-charging process took 894.8 seconds (14.91 minutes), including the 61.6-sec heating step and 10-sec thermal relaxation.

Constant voltage was applied to the heating step in the above-described experiment as the set voltage can be controlled to be in close vicinity of the open circuit voltage of a battery so as to precisely ensure there is no current flowing into the battery before the heating step is completed and the battery warms up. Constant current or power can be equally well applied to the heating step because the unique electrical circuit of the present disclosure always causes a small fraction of current to go through the battery (after overcoming the barrier of open circuit voltage) and the majority of current to go through the heater (due to no voltage barrier to overcome).

Figure 6A:
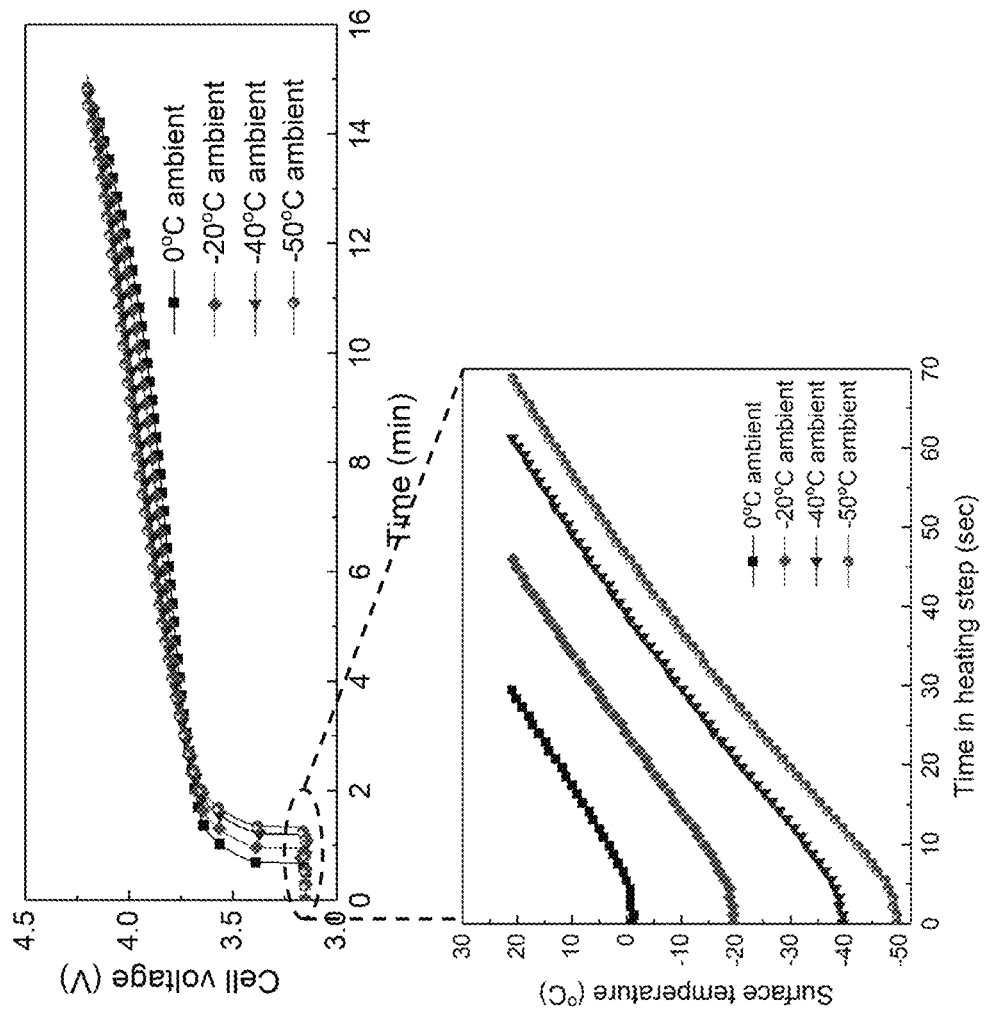
FIG. 6A and FIG. 6B show results from a series of heating-charging experiments according to an embodiment of the present disclosure from various ambient temperatures of −50° C., −40° C., −20° C. and 0° C.
Figure 6B:
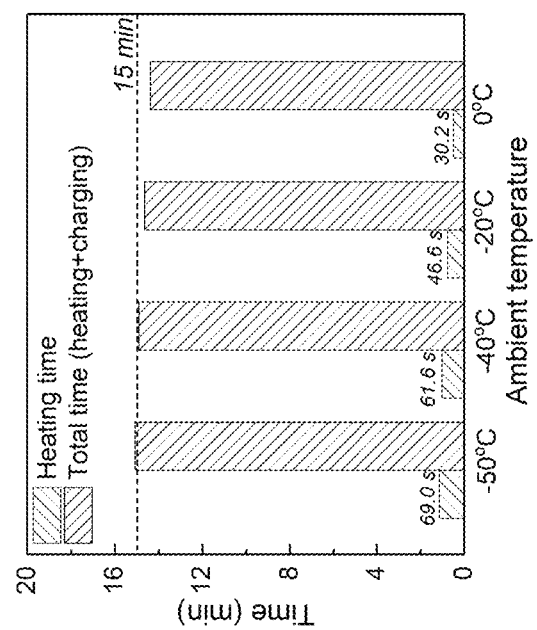

Successful heating-charging experiments were also shown in FIGS. 6A and 6B for ambient temperatures at 0° C., −20° C., −40° C. and even −50° C., respectively, according to the present disclosure. Heating times for the various initial temperatures are shown in FIG. 6B. It took 69 seconds to heat the cell from −50° C. to 20° C. (~60° C./min), and 30.2 seconds from 0° C. to 20° C. (~40° C./min). Even in the most severe case of −50° C., the heating step only accounted for 7.6% of the time of the entire process of heating and charging steps together. The total time to charge the cell to 80% SOC was similar in all four cases (FIG. 6B, 905.7-sec at −50° C. and 863.2-sec at 0° C., ~5% difference).

Figure 7:
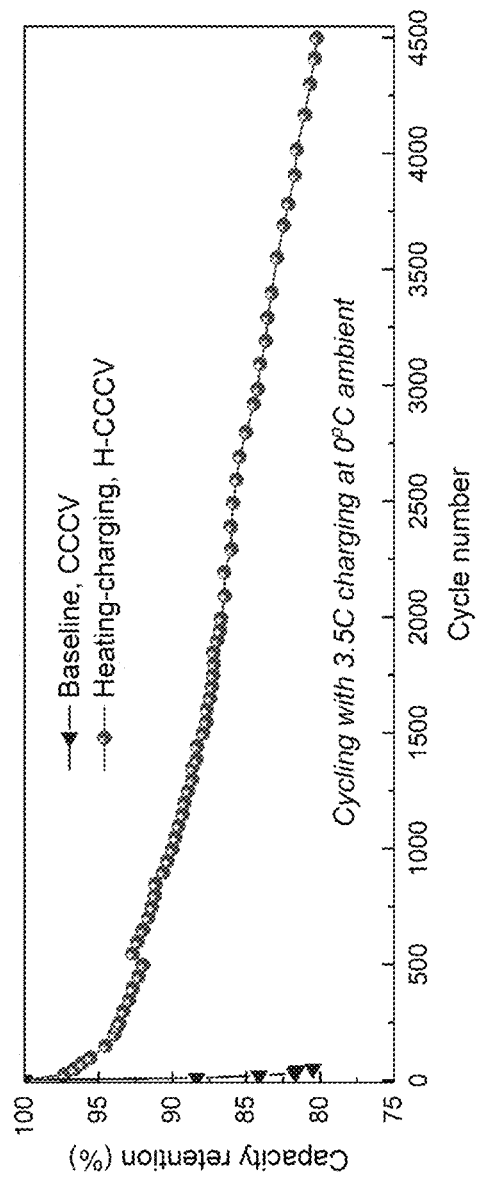
FIG. 7 compares battery capacity retention vs cycle number for battery cells with and without heating during cycling tests with 3.5 C-rate charging at 0° C. ambient temperature.

FIG. 7 compares capacity retention data of battery cycling at zero degree Celsius using 3.5 C charge rate between the heating-charging method of the present invention (h-cccv) and the conventional constant current, constant voltage (cccv) method. It is seen that the battery cell using cccv method lost 20% capacity in only 50 cycles; whereas the h-cccv method surprisingly survived 4500 cycles at the same capacity retention, which is 90× improvement in cycle life.

Figure 8:
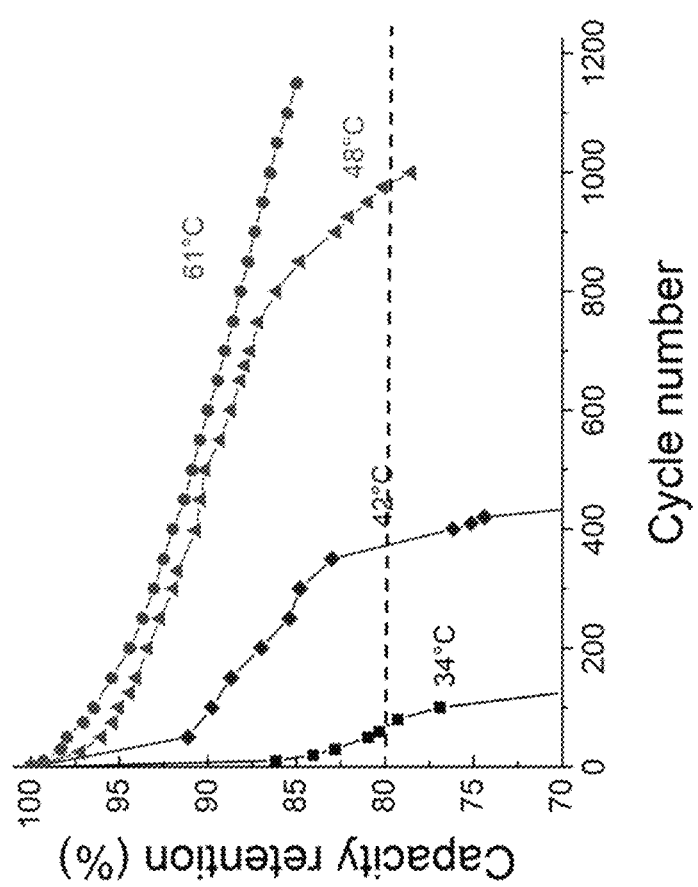
FIG. 8 is a plot of capacity retention versus cycle number for four test battery cells heated to various charge temperatures ($T_2$) prior to charging using 6 C charge rate.

FIG. 8 is a plot of capacity retention versus cycle number for various batteries heated to various charge temperatures prior to charging using 6 C charge rate. It is surprisingly shown that the cycle number at 80% capacity retention is significantly improved from less than 100 cycles at a charge temperature of 34° C. to more than 1200 with the charge temperature of 61° C. The data show a surprising 12× improvement in cycle life. The significant improvement in cycle life is surprising because it was not intuitive that rapidly heating a cell of a battery prior to charging would have such a beneficial effect on battery cell longevity.

Figure 9:
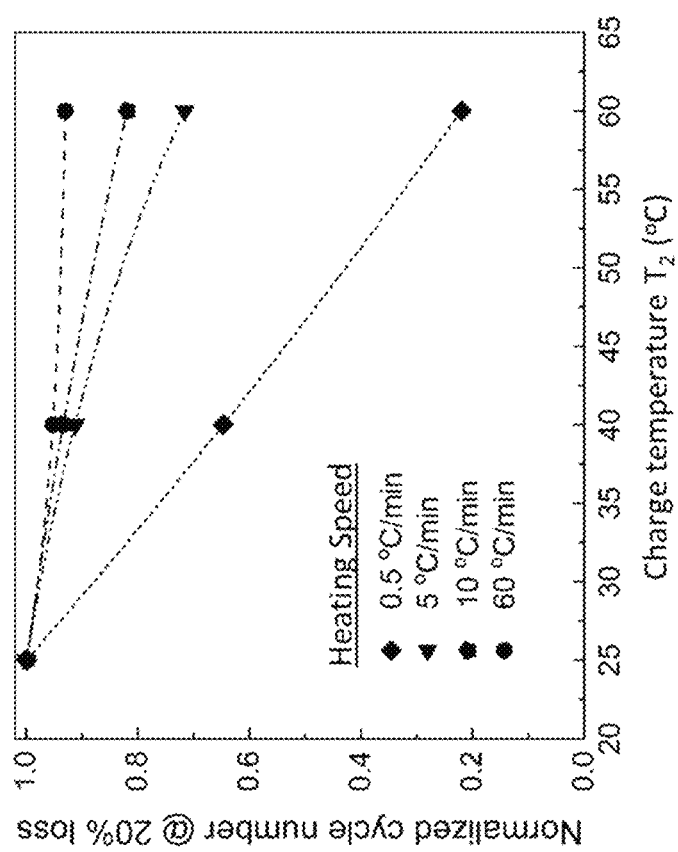
FIG. 9 shows the effect of heating speed on battery cycle life according to a heating-charging method of the present disclosure.

Based on measured data of the battery degradation rate at various charge temperatures ($T_2$), FIG. 9 summarizes the battery cycle number at 20% capacity loss as a function of the charge temperature ($T_2$) under various heating speeds (the curve parameter). It can be seen that at 0.5° C./min, the battery cycle life is sharply decreased. This decrease is believed due to an excessively long exposure time of the battery cell to the elevated charge temperatures, say at 60° C. On the other hand, by accelerating heating of a rechargeable battery to at least 5° C./min, the battery's exposure time to elevated charge temperatures is minimal, and hence the reduction in battery cycle life is limited. It is believed that the rapid heating speed of at least 5° C./min is a lower threshold rate to manage battery degradation in an optimal heating-charging method of the present disclosure.

Only the preferred embodiment of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following claims.

What is claimed is:

1. A charging method for charging a battery, the method comprising:
   a first operation which includes heating a cell of the battery at a rate of at least 5° C./min when the battery cell is below a predetermined charge temperature ($T_2$) by a charger; and
   a second operation which includes charging the battery cell by the charger when the battery cell is at or above $T_2$, wherein $T_2$ is at least 35° C.

2. The charging method of claim 1, wherein the first operation includes heating the battery cell by powering a heating element in thermal contact with a battery cell of the battery with the charger.

3. The charging method of claim 2, wherein the first operation includes heating the battery cell by powering the heating element with the charger with constant current, constant voltage, constant power or variable power.

4. The charging method of claim 1, wherein the first operation includes heating the battery at a rate of at least 10° C./min.

5. The charging method of claim 1, wherein $T_2$ is at least 40° C.

6. The charging method of claim 1, wherein the second operation includes charging the battery cell at a constant current until reaching a voltage upper limit followed by a constant voltage at the upper limit of cell voltage until a predetermined current is reached.

7. The charging method of claim 1, further comprising determining a temperature of the battery cell and if the temperature is below $T_2$, initiating the first operation to heat the battery cell and if the temperature is at or above $T_2$, charging the battery cell.

8. An integrated heating and battery system comprising:
a rechargeable battery including at least one battery cell;
a heating element in thermal contact with the at least one battery cell and electrically connected in series to a switch to form a switch-heater assembly;
wherein the switch-heater assembly is electrically connected in parallel with the battery to form a battery-switch-heater circuit; wherein the battery-switch-heater circuit is configured to be directly electrically engaged with a charger; and
wherein the heating element is powered mainly by the charger and electrically connected to the at least one battery cell when the heating element is mainly powered by the charger.

9. The integrated heating and battery system according to claim 8, wherein the at least one battery cell comprises an anode which comprises lithium metal.

10. The integrated heating and battery system according to claim 8, wherein the at least one battery cell comprises an anode which comprises silicon or a silicon-carbon composite.

11. The integrated heating and battery system according to claim 8, wherein the at least one battery cell comprises an anode and a cathode, wherein the anode comprises lithium metal and the cathode is configured to operate with air as a reactant.

12. The integrated heating and battery system according to claim 8, wherein the at least one battery cell comprises a solid electrolyte.

13. The integrated heating and battery system according to claim 8, wherein the at least one battery cell comprises an electrolyte containing a salt at a concentration of greater than 4 moles per liter.

14. The integrated heating and battery system according to claim 8, wherein the heating element is located either inside the at least one battery cell or in contact with an outer surface of the at least one battery cell.

15. The integrated heating and battery system according to claim 8, wherein the heating element comprises a resistor sheet having two major surfaces and a thickness of 1-200 micrometers.

16. The integrated heating and battery system according to claim 15, wherein the resistor sheet comprises graphite, highly ordered pyrolytic graphite (HOPG), stainless steel, nickel, chrome, nichrome, copper, aluminum, titanium, or combinations thereof.

17. The integrated heating and battery system according to 8, wherein the switch comprises an electromechanical relay and a temperature controller, or a solid-state relay with a temperature sensor, or a power MOSFET with a temperature sensor, or a high-current switch with a temperature sensor, or an insulated-gate bipolar transistor, or a bi-metal switch.

18. The integrated heating and battery system according to claim 8, wherein the switch is located inside the at least one battery cell.

19. The integrated heating and battery system according to claim 8, wherein the switch is configured to pulse with time during a charging operation.

20. The integrated heating and battery system according to claim 8, wherein both the heating element and switch are located inside the battery cell.

21. A charging method for charging a battery, the method comprising:
a first operation which includes heating a cell of the battery at a rate of at least 5° C./min by a charger when the battery cell is below a predetermined charge temperature ($T_2$); and
a second operation which includes charging the battery cell by the charger at a charge rate of 3.5 C or higher when the battery cell is at or above $T_2$,
wherein $T_2$ is at least 35° C.

22. The charging method of claim 21, further comprising determining a temperature of the battery cell and if the temperature is below $T_2$, initiating the first operation to heat the battery cell and if the temperature is at or above $T_2$, charging the battery cell, wherein the battery cell is charged at a rate of 0.1 C or less during the first operation.

23. The charging method of claim 21, charging the battery cell at a constant current until reaching a voltage upper limit followed by a constant voltage at the upper limit of cell voltage until a predetermined current is reached.

24. The charging method of claim 21, wherein $T_2$ is at least 40° C.

* * * * *